US012716233B2

(12) United States Patent
Uribegan et al.

(10) Patent No.: US 12,716,233 B2
(45) Date of Patent: Aug. 25, 2026

(54) RESIDENTIAL COMMUNITY CONSTRUCTION

(71) Applicant: Personal Apportion Dwellings LLC, Detroit, MI (US)

(72) Inventors: Luis Antonio Uribegan, Detroit, MI (US); Matthew Colin Perkins, Detroit, MI (US)

(73) Assignee: Personal Apportion Dwellings LLC, Detroit, MI (US)

(*) Notice: Subject to any disclaimer, the term of this patent is extended or adjusted under 35 U.S.C. 154(b) by 523 days.

(21) Appl. No.: 18/340,147

(22) Filed: Jun. 23, 2023

(65) Prior Publication Data

US 2024/0426101 A1 Dec. 26, 2024

(51) Int. Cl.

| | |
|---|---|
| ***E04B 2/74*** | (2006.01) |
| ***G06Q 40/04*** | (2012.01) |
| ***G06Q 50/08*** | (2012.01) |

(52) U.S. Cl.

CPC ........... *E04B 2/7409* (2013.01); *G06Q 40/04* (2013.01); *G06Q 50/08* (2013.01); *E04B 2002/7488* (2013.01)

(58) Field of Classification Search

CPC ........ E04B 2/7409; E04B 2/74; E04B 2/7401; E04B 2/7403; E04B 2/7407; E04B 2002/7477; E04B 2002/7474; E04C 2/32; E04C 2/322

See application file for complete search history.

(56) References Cited

U.S. PATENT DOCUMENTS

| | | | | |
|---|---|---|---|---|
| 3,481,090 A * | 12/1969 | Lizee | E04B 2/825 | 52/241 |
| 3,631,647 A * | 1/1972 | Merkin | E04B 2/72 | 52/645 |
| 3,633,327 A * | 1/1972 | Klingensmith | E04B 2/72 | 52/645 |
| 3,820,295 A * | 6/1974 | Folley | E04B 1/08 | 52/630 |
| 4,161,087 A * | 7/1979 | Levesque | E04B 1/14 | 52/407.3 |
| 5,165,213 A * | 11/1992 | Finch | E04B 2/721 | 52/578 |
| 9,010,054 B2 * | 4/2015 | Herdt | B29C 44/1214 | 52/783.17 |
| 2005/0204699 A1 * | 9/2005 | Rue | E04C 2/384 | 52/794.1 |

(Continued)

FOREIGN PATENT DOCUMENTS

| | | | |
|---|---|---|---|
| EP | 3467230 A1 * | 4/2019 | E04D 13/1643 |

OTHER PUBLICATIONS

Raydoor Sliding Walls and Doors, © 2014-2022 by Sliding Walls, Doors, and Room Dividers | Raydoor Inc. https://raydoor.com.

(Continued)

*Primary Examiner* — Theodore V Adamos
(74) *Attorney, Agent, or Firm* — DeWitt LLP

(57) ABSTRACT

Systems and methods of modular construction. Modular wall systems segregate building spaces assigned to specific owners. Flexible housing provided by modular wall systems can expand or contract in size to adapt to owner and building needs. Modular wall systems provide walls that can be configured and reconfigured to partially or fully enclose units.

20 Claims, 11 Drawing Sheets

(56) References Cited

U.S. PATENT DOCUMENTS

| | | | | |
|---|---|---|---|---|
| 2012/0144774 | A1 * | 6/2012 | Andrews | E04B 2/7411<br>52/656.9 |
| 2019/0100932 | A1 * | 4/2019 | Nelson | E04B 1/342 |
| 2023/0175255 | A1 * | 6/2023 | Haba | E04B 2/82<br>52/238.1 |

OTHER PUBLICATIONS

Hufcor, Folding Partitions. The Basics from Hufcor, the Global lender, © 2021 by Hufcor, Inc. https://www.hufcoramericas.com/post/folding-partitions-the basics-from-hufcor-the-global-leader.

DIRTT Construction Systems | Modular Interior Construction, © DIRTT 2023 https://www.dirtt.com.

Steelcase| Modular Office Privacy Walls a& Glass Partitions. © 1996-2023 Steelcase Inc. https://www.steelcase.com/products/walls-work-walls/.

HermanMiller | Overlay Room Divider, © 2023 Herman Miller, Inc. https://www.hermanmiller.com/products/space-division/room-dividers/overlay/.

* cited by examiner 68
70
60
62
64
72
66

64
70

68
68
68
68
70
70
70
64
64
62
62
64
70
64

70
68
62

64

72

72
72
62
64
64
62
72
66
66
66

52
53
54

53
54
52

52

RESIDENTIAL COMMUNITY CONSTRUCTION

CROSS-REFERENCED TO RELATED APPLICATIONS

Not applicable

STATEMENT REGARDING FEDERALLY SPONSORED RESEARCH OR DEVELOPMENT

Not applicable

BACKGROUND

I. Technical Field

Embodiments relate to modular construction. More specifically, embodiments relate to modular construction systems and methods to provide flexible housing.

II. Background Discussion

Historically, communities have been built using either an individual owned parcel model, rental model, a timeshare model, condominium model, or a cooperative association model. Each model offers diverse benefits that are well known. Each model also has various disadvantages. Such disadvantages include construction and ownership costs, lack of equity, and lack of flexibility as the space needs to change over time.

Often, a person or a couple buys a starter home, buys a larger home to meet the needs of a growing family, and then possesses more space than they require as their children become emancipated. Buying, selling, and leasing of either residential space is not cheap, and moving can disrupt families and businesses alike.

As such, there is a real need for a new model of ownership and new construction techniques that facilitate the expansion and contractions of residential over time thereby better and more efficiently meeting the needs of property owners.

SUMMARY

Embodiments described herein address the problems identified above by providing a flexible ownership model bundled with innovative modular construction techniques. More specifically, embodiments discuss an enterprise creating a community comprising a plurality of shells. As used herein, "shell" means a site under ownership or lease for the explicit purpose of providing contract-based space for flexible housing that can expand or reduce in size, while also providing shared common amenities and services with other owners at the same location. The shell may be a building, a portion of a building, or a site comprising several buildings. The enterprise authorizes shares based on the total value of the community. Fundamentally, each share represents a percentage of the total space of the community, although some segments of the space may be allocated more than one share because of the shell in which the segment is located or the location of the segment within the shell.

The enterprise then issues blocks of shares to purchasers. The number of shares in a specific purchaser's block varies and changes over time as that purchaser either acquires more shares or transfers shares back to the enterprise or to other purchasers. Ownership of a block of shares entitles a purchaser to be assigned by the enterprise at least one unit in a shell owned by the enterprise. The size of the unit will depend on the number of shares owned by the purchaser.

Walls are erected within the shell to enclose the space in the shell allocated to the unit. These walls are of modular construction. This is important because the size or location of the unit may change over time. More specifically, each purchaser is permitted to adjust the number of shares the purchaser owns by acquiring additional shares and transfer portions of the shares the purchaser owns to others. With each such adjustment, the size (and/or location) of the unit assigned to the purchaser changes. The modular construction of the walls of the original unit enables the walls to be reconfigured to at least partially enclose the new unit which will be of a different size or shape, or at a different location, than the original unit. For example, when an owner buys additional shares, the buyer acquires additional physical wall pieces along with the additional shares and is assigned a larger space. The wall pieces already owned by the owner and used to construct the walls of the owner's original unit (or substitutes for such pieces) together with the additional wall pieces acquired with the additional shares, are used in the construction of the owner's new, larger unit. Similarly, when an owner sells shares and the associated wall pieces, the buyer is assigned a smaller space and the unsold wall pieces used in the construction of the original unit (or substitutes for such wall pieces) are used in the construction of the owner's new, smaller unit.

The walls of modular construction used to enclose and subdivide and allocated space (unit) into rooms are made using lower track members and upper track members, each comprising a base and first and second opposing walls extending from said base. The opposing walls of the lower track members define a first utility channel and opposing retention members. Each opposing wall also provides an exterior ledge that extends parallel to the base. Lower utility channel covers, adapted to fit between the first and second opposing walls of the lower track member and be held in place by the retention members, are provided to cover portions of the utility channel of the lower track member and hold portions of the opposing walls of the lower track member parallel to each other. Likewise, the opposing walls of the upper track members define a second utility channel and opposing retention members. Upper utility channel covers, adapted to fit between the first and second opposing walls of the upper track member and be held in place by the retention members, are provided to cover portions of the utility channel of the upper track member and hold portions of the opposing walls of the upper track member parallel to each other. Electrical and communications cables may be run through the utility channels of the upper track members and plumbing conduits may be run through the utility channels of the lower track members to desired termination points to supply electrical and communication, plumbing and HVAC devices. Separate sets of cables and conduits are run through the utility channels as necessary to individually serve the separate units of the shell.

The walls further include molded panels. As used herein, "molded panels" means panels that are shaped for structural integrity that are manufacturable in a variety of materials and processes. Each have an upper flange, a lower flange, and a concave and corrugated center section between the upper flange and lower flange. The panels may be formed as a single unit. Optionally, and to create walls of differing heights, the panels may have a top section, a bottom section, and one or more intermediate sections. Various techniques may be employed to couple the sections of the molded panels together. For example, the sections may be molded to include interlocking fingers which are interlaced to hold the adjacent sections together. A tongue and groove arrangement may alternatively be employed. In other embodiments, portions of two adjoining sections of the molded panels may overlap and fasteners extending through the overlapping portions may be used to couple the sections together. The lower flanges of the molded panels are adapted to be positioned outside and adjacent to one of the opposing walls of the lower track member and the upper flange is adapted to be position along the same side of an upper track member, and more specifically outside and adjacent to the corresponding opposing wall of the upper track member.

The molded panels are attached to the lower and upper track members using elongate retainers and a set of through-fasteners. These elongate retainers may simply be a flat plate or may each comprise a plate having a first edge and an offset flange extending from the plate and terminating in a second edge. Typically, a first elongate retainer will first be joined to one of the opposing walls of the lower track member. When doing so, this first elongate retainer is positioned so that the first edge of the first elongate retainer engages the ledge of the wall of the lower track member, the plate of the first elongate retainer is in face-to-face registration and contact with the wall of the lower track member, and the offset flange of the first elongate fastener is spaced from the wall of the lower track member. Screws, extending through the plate the first elongate retainer, are used to couple the first elongate retainer to the wall of the lower track member. Next, the lower flange of the molded panel is positioned between the offset flange of the first elongate retainer and the wall of the lower track member. The screws are then fully tightened.

A second elongate retainer is used to couple the upper flange of the molded panel to an upper track member. More specifically, the molded panel is pushed so that the flat upper flange of the panel engages a wall of the upper track member. The second elongate retainer is then positioned so that the first edge of the second elongate retainer engages the ledge of the wall of the upper track member, the flat plate of the second elongate retainer is in face-to-face and contact registration with the wall of the upper track member, and the flat upper flange of the molded wall panel is sandwiched between the wall of the upper track member and the offset flange of the second elongate retainer. Fasteners extending through the plate of the second elongate retainer are then used to secure the second elongate retainer to the upper track member.

Assembly continues with the use of additional molded panels and elongate retainers. Contiguous molded panels are fastened to opposite opposing walls of the upper and lower track members using elongate retainers as described above.

Sound absorbing or thermal insulating materials may be placed in the concave portion of the panels before applying a surface layer to each side of the panels.

Panels can be constructed in sections of various sizes to accommodate installation of doors and windows and walls of different heights. Outer removable finish panels of varying types are coupled to the upper and lower track members, molded panels or elongate retainers in any of a variety of ways to complete construction of the wall.

As should be clear from the foregoing, construction of walls as described above significantly reduces labor costs and promotes recycling and reuse of materials providing significant sayings when remodeling or reconfiguring spaces.

Significantly, the owner of a unit supplies and retain ownership of the molded panels, surface finish layers, and certain other materials, such sound absorbing or thermal insulating materials, and surface layers, doors, and bath, kitchen, and other fixtures interior to the space, used to construct unit. These are adapted to be reconfigured and reused thereby reducing the costs associated with changing the size or location of the unit. The modular construction likewise reduces the cost of initial construction of the unit.

Additionally, the purchasers of contiguous units share expenses associated with constructing the shared walls between the units. Each purchaser buys, and retains ownership of, the surface finish layer on their side of a shared wall. Each also buys and retains ownership of a subset of the interior components used to construct the wall, e.g., the molded panels and insulative panels. These components are treated as fungible commodities within the community such that they can be bought, sold or traded to reduce disruption, cost and loss of equity in such components as adjustments to unit sizes and locations are made.

BRIEF DESCRIPTION OF THE DRAWINGS

The foregoing features, objects and advantages of will become apparent to those skilled in the art from the following detailed description of embodiments, especially when considered in conjunction with the accompanying drawings in which like numerals in the several views refer to corresponding parts.

DETAILED DESCRIPTION

Figure 1:
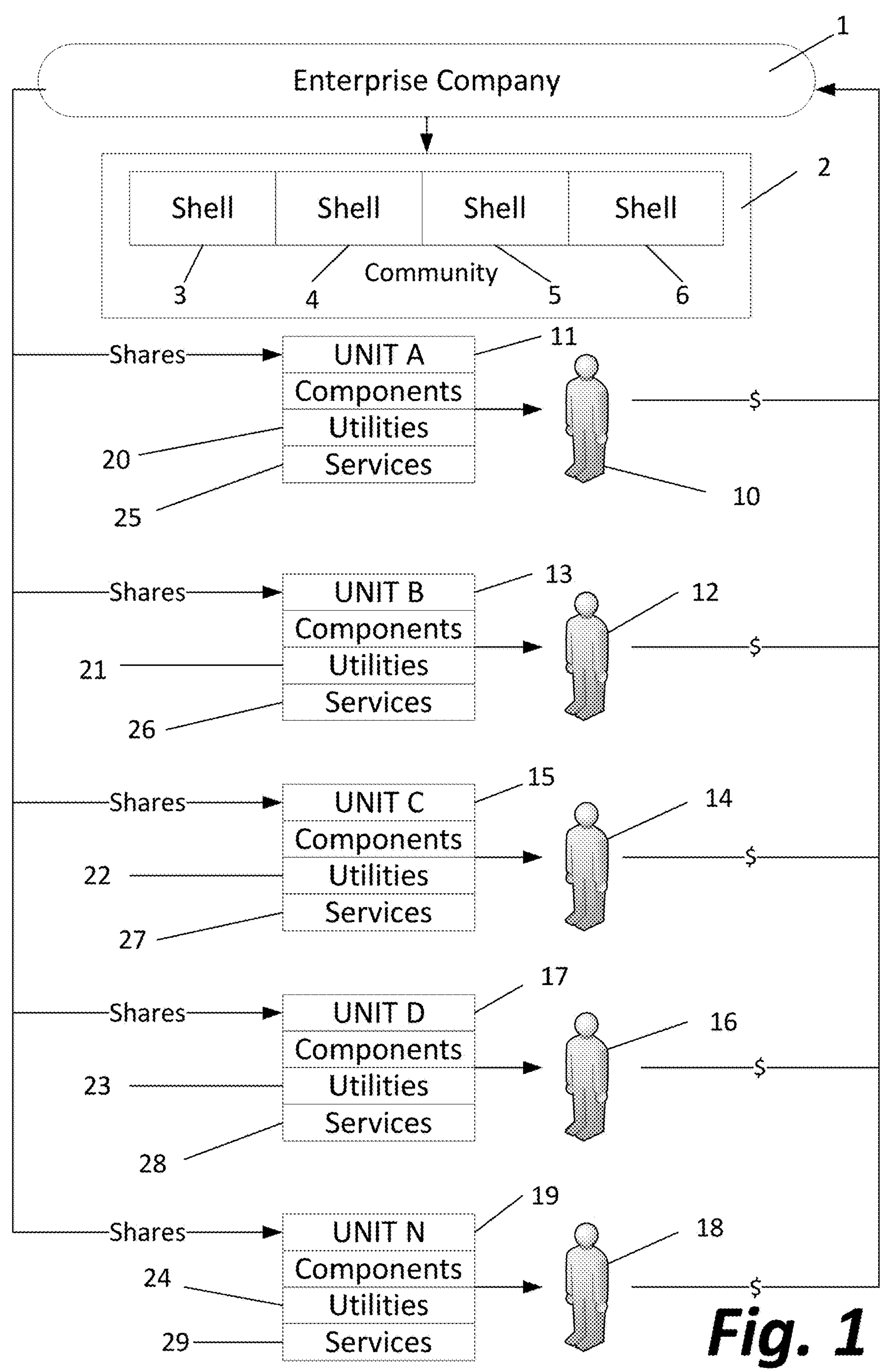
FIG. 1 is a schematic diagram of a community constructed using modular construction techniques, according to an embodiment.

This description is intended to be read in connection with the accompanying drawings, which are to be considered part of the entire written description. In the description, relative terms such as “lower”, “upper”, “horizontal”, “vertical”, “above”, “below”, “up”, “down”, “top” and “bottom” as well as derivatives thereof (e.g., “horizontally”, “downwardly”, “upwardly”, etc.) should be construed to refer to the orientation as then described or as shown in the drawings under discussion. These relative terms are for convenience of description and do not require that the apparatus be constructed or operated in a particular orientation. Terms such as “connected”, “connecting”, “attached”, “attaching”, “join” and “joining” are used interchangeably and refer to one structure or surface being secured to another structure or surface or integrally fabricated in one piece, unless expressively described otherwise.

Figure 2:
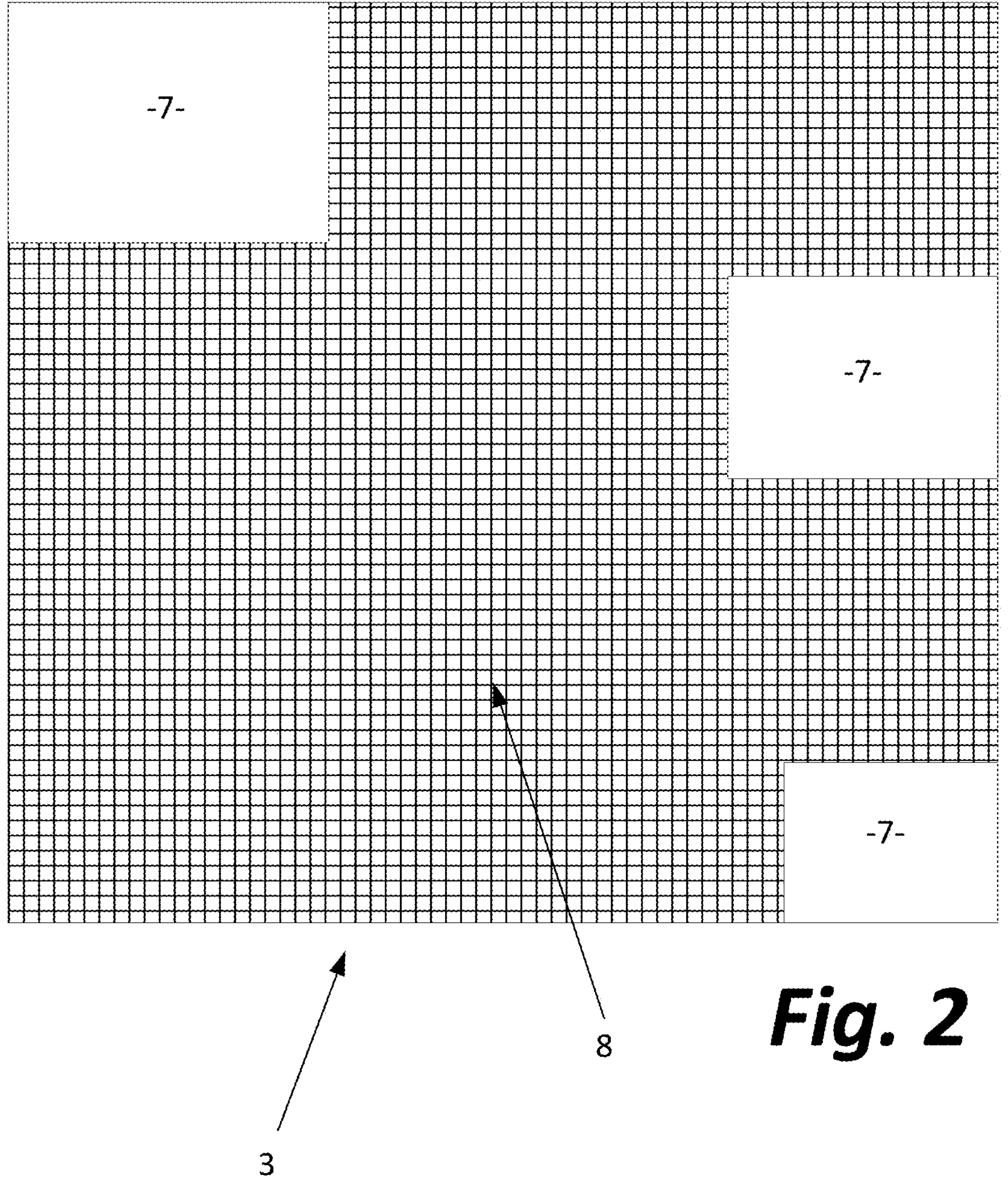
FIG. 2 is a schematic diagram of one of the shells of the community having both public and private spaces.

FIGS. 1 and 2 show a method of employing an enterprise company 1 to construct a real estate community 2 comprising a plurality of shells 3 through 6. The shells may be in the same locale. They may also be in different cities or even different countries. Each shell comprises public spaces 7. Public spaces 7 include foyers, hallways, utility rooms, elevators, and stairways. Public spaces 7 may also include laundry rooms, bathrooms, kitchens, dining rooms, exercise rooms, gardens, playgrounds, party and meeting rooms, guest rooms, pools, gymnasiums, and the like. The remainder of each shell comprises private space 8.

The enterprise company 1 authorizes shares based on the total value of the community. Fundamentally, each share represents a percentage of the total space of the community, although some segments of the space may be allocated more than one share because of the shell in which the segment is located or the location of the segment within the shell.

The enterprise company 1 then issues blocks of shares to purchasers 10, 12, 14, 16, and 18. The number of shares in a specific purchaser’s block varies and changes over time as that purchaser either acquires more shares or transfers shares back to the enterprise or to other purchasers. Ownership of a block of shares entitles a purchaser to be assigned by the enterprise company 1 one unit 11, 13, 15, 17 or 19 in a shell 3, 4, 5, or 6 owned by the enterprise company 1. The size of the unit will depend on the number of shares owned by the purchaser. In some cases, an owner can split a share block into smaller blocks and use the smaller blocks to secure a separate assignment for each block. In this way an owner can gain ownership of separate units either in the same shell or, more typically, in different shells located in different geographic locations.

More specifically, each such purchaser is allocated a unit. In FIG. 1, purchaser 10 is assigned unit 11, purchaser 12 is assigned unit 13, purchaser 14 is assigned unit 15, purchaser 16 is assigned unit 17, and purchaser 18 is assigned unit 19, each a portion of the private space in a shell. The size of the unit assigned to the purchaser is proportional to the number of shares in the block acquired by the purchaser to total number of shares in the set of ownership shares. A unit may be located within any of the shells 3-6. The shell in which a unit is located may change from time to time. For example, if unit 11 is originally located in shell 3, purchaser 10 may request that unit 3 be moved to a different space in shell 3 or to any of shells 4-6. Likewise, the size of the unit assigned to a purchaser may change as the purchaser acquires more shares or transfers a portion of the purchaser’s shares owned to someone else such as back to the enterprise.

The enterprise company 1 may also provide various utilities 20 through 24 and services 25 through 29. Utilities may include heating, air conditioning, electrical, natural gas, water, internet, cable television or the like. Such services may include restaurant services, concierge services, home health care services, cleaning services, maintenance services or the like. The enterprise company 1 may charge purchasers fees for use and maintenance of the public spaces, and for use of the offered utilities and services. Some charges for such items are bundled while other items are offered for a fee on an a la carte basis. Purchasers are billed based upon the public spaces, utilities, and services they use. Certain charges may be based on the percentage of either the total space or the total private space of the shell the purchaser’s unit occupies.

Once an assignment of unit within a shell is made to a purchaser, walls are erected within private space 8 to enclose the unit, i.e., the space within a shell allocated to the purchaser. As discussed in further detail below, these walls are of modular construction and components used to create the walls are sold by the enterprise company 1 to the purchaser and then owned by the purchaser. The purchaser can also purchase electrical, plumbing, bath, kitchen, and other fixtures from the enterprise company 1 to complete the space. This offers important advantages. All such purchases can be financed through enterprise company 1. The modular design reduces initial construction costs. The modular design allows purchasers to take their walls and fixtures with them if they elect to have their unit reassigned and moved to a different shell or a different space within a shell. Modular construction allows for easy modification of walls as units are increased or decreased in size as share ownership changes.

Permitting any purchaser to adjust the size of the unit assigned to them, either by acquiring additional shares or by transferring shares to others, offers important advantages. The purchaser can routinely and periodically “right-size” the unit they own and occupy very efficiently. Reallocating private space to the unit and reconfiguring the walls to enclose the reallocated space becomes much less expensive when modular wall systems of the type described below are employed.

Tracking ownership is achieved in certain embodiments by attaching shares to units, and the allocation of private space to each unit. Additionally, the shares are attached to a deed. The owner of the deed, like the size, layout and location of the unit, can change at any point. Further, a new owner may not occupy the entirety of the original owner’s space. The new owner, using their own molded wall panels, may configure the space differently than as the space was configured by the previous owner.

FIGS. 3 through 24 show an illustrative embodiment of the modular wall system used to enclose a unit, e.g., unit 11, within a shell, e.g., shell 3. The wall 30 of modular construction includes at least one lower track member 32, at least one upper track member 34.

Figures 18, 19, 20:
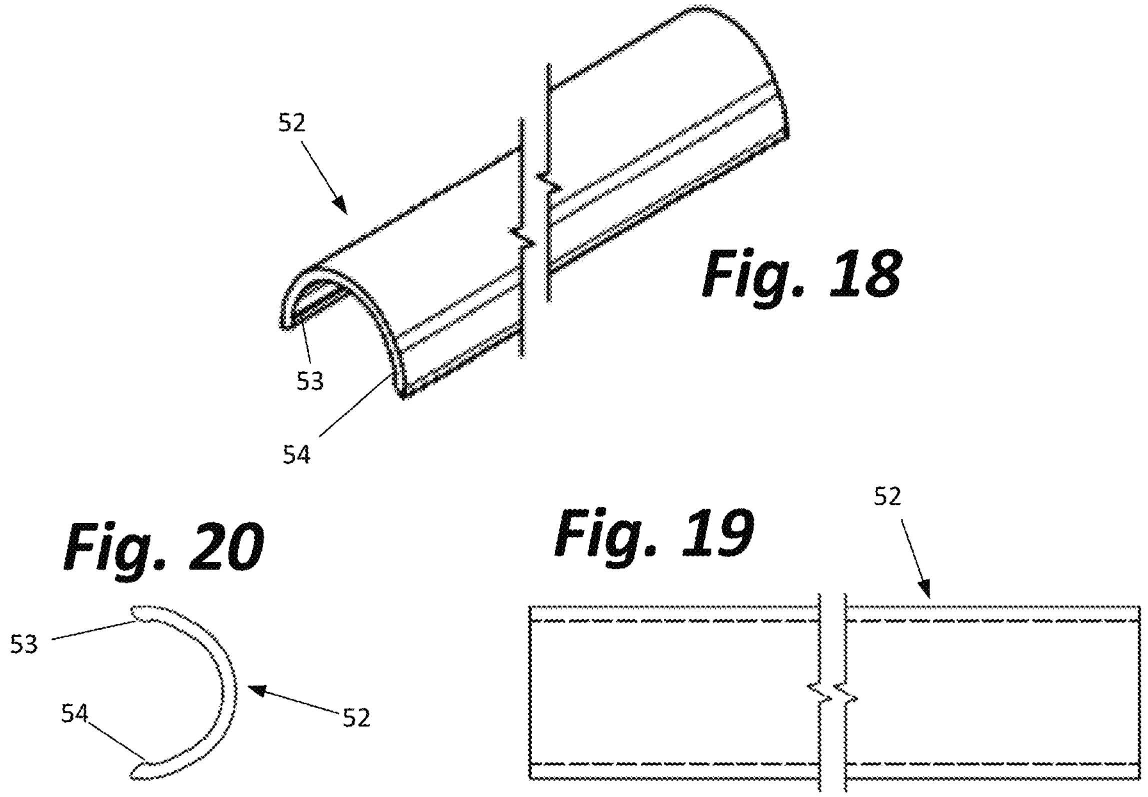
FIG. 18 is a perspective view of a utility channel cover adapted for use in conjunction with the track of FIG. 15.
FIG. 19 is a top view of the utility channel cover of FIG. 18.
FIG. 20 is an end view of the utility channel cover of FIG. 18.
Figures 21, 22, 23:
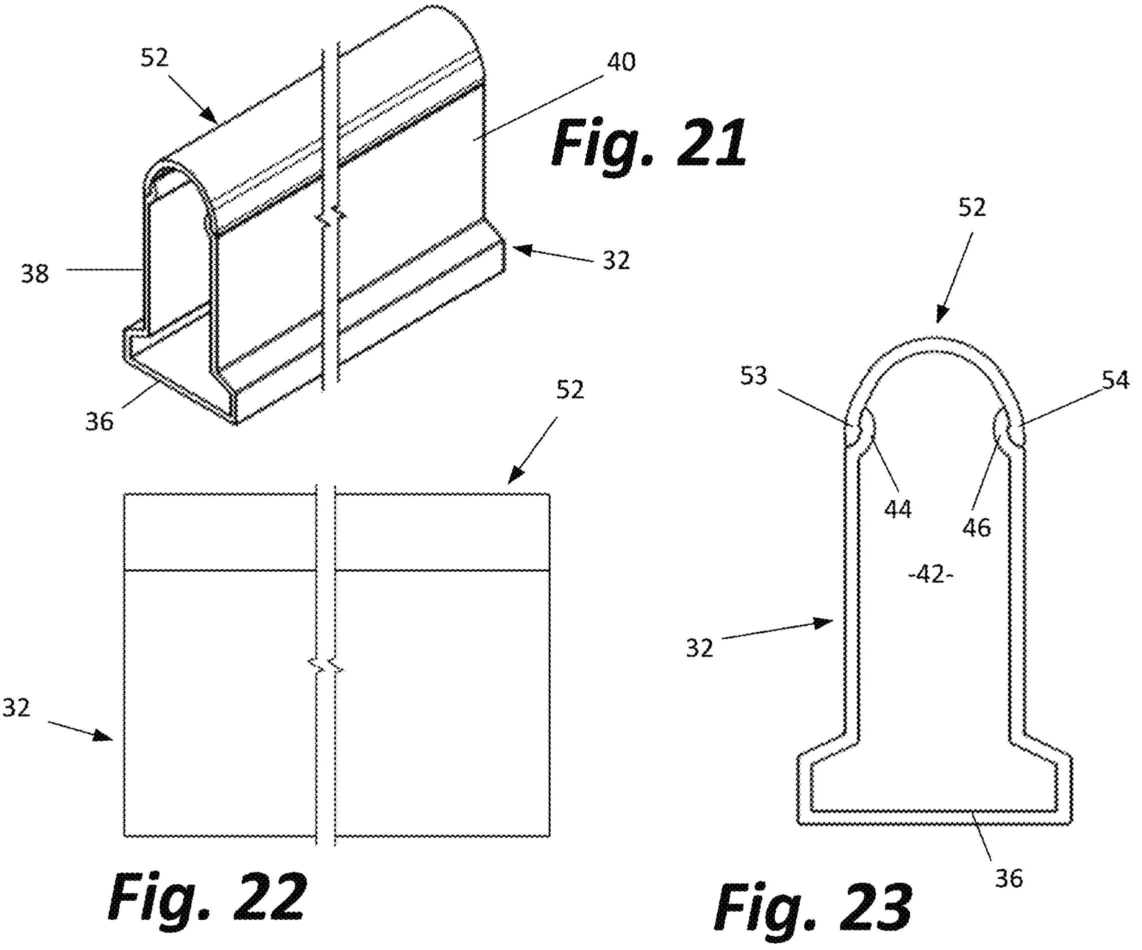
FIG. 21 is a perspective view of a utility channel cover of FIG. 18 connected to the track of FIG. 15.
FIG. 22 is a top view of the utility channel cover of FIG. 18 connected to the track of FIG. 15.
FIG. 23 is an end view of the utility channel cover of FIG. 18 connected to the track of FIG. 15.
Figures 24, 25:
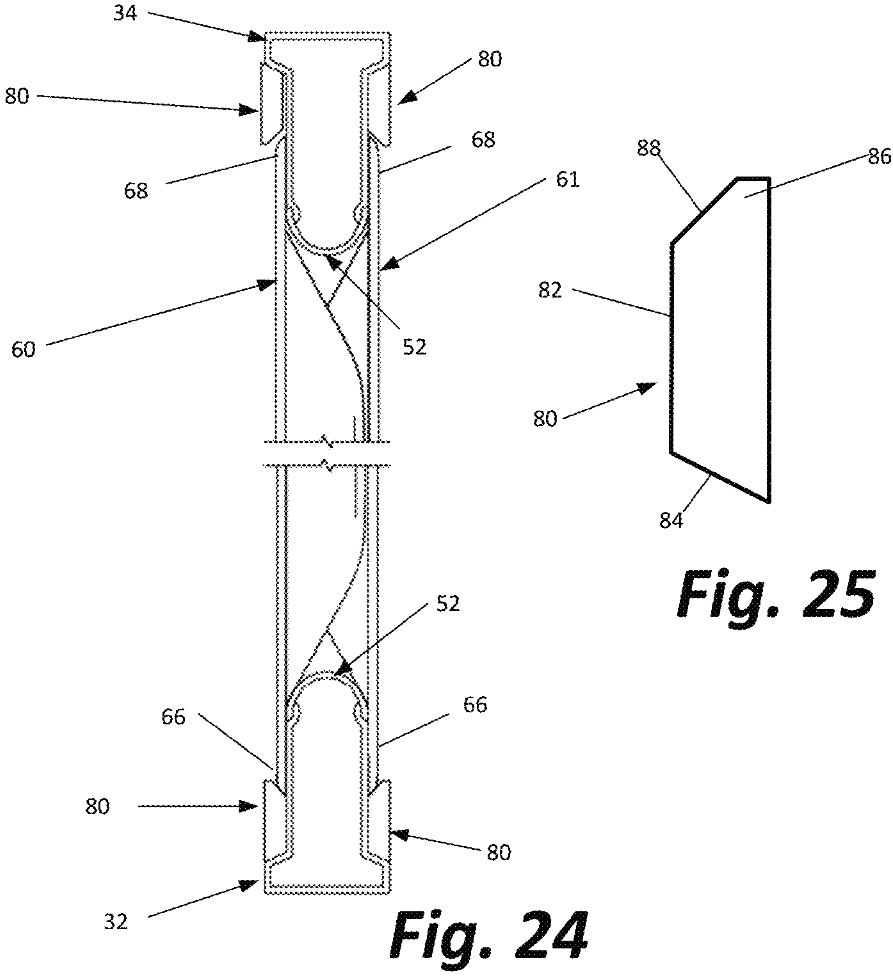
FIG. 24 is a cross-sectional view showing two panels joined to upper and lower tracks using elongate retainers and utility channel covers also attached to the tracks.
FIG. 25 is a cross section of an elongate retainer.

Each track member 32/34 comprises a base 36, and first and second opposing walls 38 and 40 extending from said base 36. Opposing walls 38 and 40 defining a utility channel 42 and opposing retention members 44 and 46. Opposing walls 38 and 40 also include a ledge 48/50. The wall 30 also includes a plurality of utility channel covers 52. The utility channel covers 52 are positioned at various locations along the lower and upper track members 32/34 and are adapted to be held in place by the retention members 44 and 46. The utility channel covers 52 not only partially close the utility channels 42 but also may serve to hold the free ends of the opposing walls 38 and 40 particularly when a light spring tension is designed into the walls 38 and 40 below the retention members 44 and 46 to bias the walls and retention members apart. As shown in FIGS. 18 through 20, the utility channel covers 52 comprise a semi-circular wall terminating in elongated detents 53 and 54. As shown in FIGS. 21 through 23, the detents 53 and 54 are adapted to snap into the retention members 44 and 46 of a lower track member 32 or upper track member 34.

Figure 3:
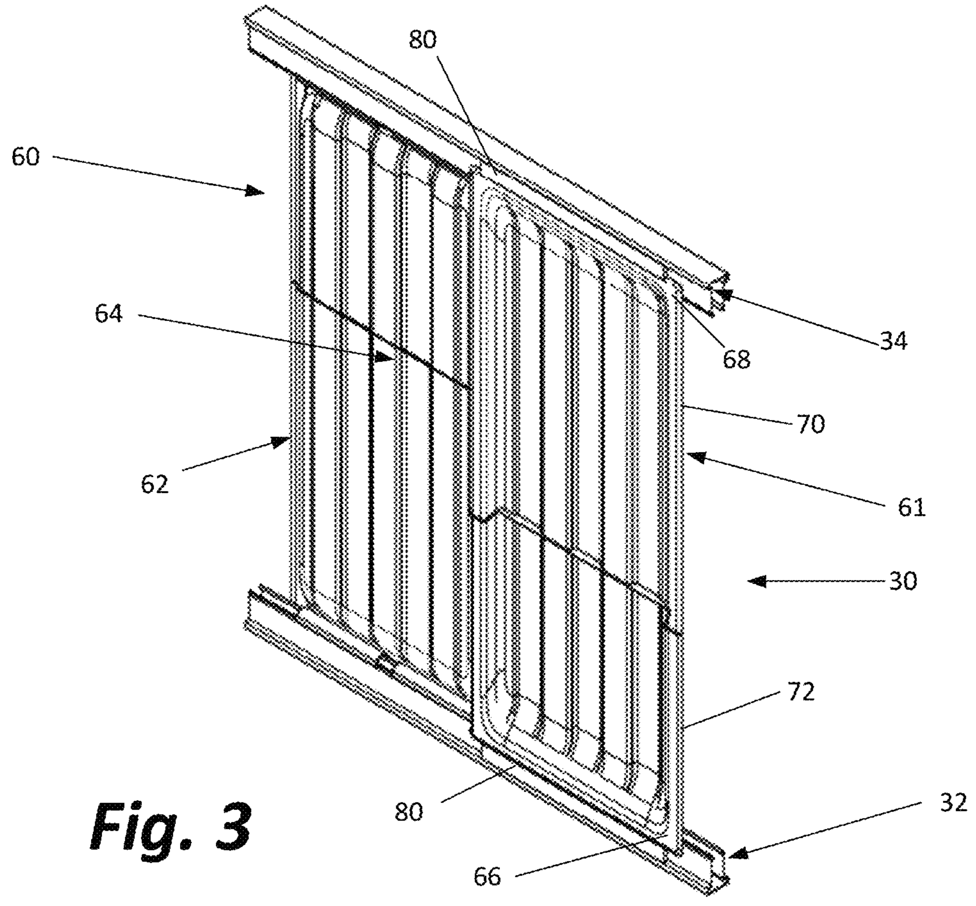
FIG. 3 is a perspective view of a subassembly of a wall section constructed, according to an embodiment.

Each wall 30 typically includes at least one molded panel. In some cases, such as when a door or window fills an entire wall, this will not be the case. Two such molded panels 60 and 61 are shown in FIG. 3. Panels 60 and 61 are of the same design and construction. These panels each have a concave and corrugated center section 64 and may include an outer frame 62 surrounding the center section 64. Whether or not such a frame is provided, the panels each have a flat lower flange 66 and a flat upper flange 68. The molded panels 60 may be formed as a single unit. Optionally, and to create walls of differing heights and to accommodate windows, the molded panels 60 may have a top section 70, a bottom section 72, and one or more intermediate sections 74. The sections 70/72/74 are molded to include interlocking fingers which are interlaced to hold the adjacent sections together. Alternatively, they may be locked together using a tongue and groove arrangement. Detents may be added to further secure the panels sections together. Rather than using a separate intermediate sections 74 to provide height adjustment, the top section 70 and bottom section 72 may be fabricated so that when assembled they can telescope relative to each other to provide even greater adjustability enabling construction of walls of different heights. Fasteners or detents may be provided to selectively enable and prevent telescoping of the sections 70/72.

The walls 30 further comprising a plurality of elongate retainers 80 comprising a flat plate 82 extending from a first edge 84 and an offset flange 86 extending to a second edge 88. A plurality of screw holes may be formed in the flat plate. The elongate retainers 80 are adapted to cooperate with the walls 38 or 40 of the upper and lower track members 32 and 34 to securely fasten the molded panels 60/61 to the upper track member 34 and the lower track member 32.

Walls are formed as follows using at least the various components described above. The lower track member(s) 32 are fastened to a floor of the shell at a desired location using nails, screws, bolts, rivets, or an adhesive. The upper track member(s) 34 are coupled to a ceiling of the shell, again using nails, screws, bolts, rivets, or an adhesive, so the upper track member(s) are parallel and plumb with respect to the lower track member(s). At this point, cables, and conduits (not shown) can be run through the upper and lower track members 32 and 34 to desired termination points. After, or while, positioning the cables and conduit, the utility channel covers 52 are attached to the upper and lower track members 32 and 34 by snapping the utility channel covers 52 in place with respect to retention members 44 and 46.

Next, top section 70 and a bottom section 72 are joined together to form a molded panel 60. Depending on the height of the wall being constructed, the top and bottom sections 70/72 are telescoped to provide a panel of the desired height and then locked together using a set of suitable detents or fasteners. Alternatively, one of more intermediate sections may be interposed between the top and bottom sections 70/72 when forming the molded panel 60.

A first elongate retainer 80 is then positioned and attached to opposing wall 38 of a lower track member 32. More specifically, the flat plate 82 of this first retainer 80 is placed in face-to-face contact with the outside surface of the opposing wall 38 with the first edge 84 of the first retainer 80 in contact with the ledge 48 of the opposing wall 38. A gap is thus formed between flange 86 of the elongate retainer and the outside surface of opposing wall 38. Screws or other suitable fasteners may then be used to secure the first elongate retainer 80 to opposing wall 38. This gap is adapted to receive the lower flange 66 of the molded panel 60. The screws can be tightened after positioning lower flange 66 of the molded panel 60 in this gap to firmly hold the molded panel 60 in place relative to the lower track member 32.

The molded panel 60 is secured to the upper track member 34 in a similar fashion. Specifically, the upper flange is pushed against the opposing wall 38 of the upper track member 34 below the ledge 48 and the flat plate 82 of a second elongate retainer 80 is placed in face-to-face contact with the outside surface of the opposing wall 38 with the first edge 84 of the second elongate retainer 80 in contact with the ledge 48 of the opposing wall 38 of the upper track member 34. A gap is thus formed between flange 86 of retainer 80 and the outside surface of opposing wall 38. Fasteners may then be used to secure the second elongate retainer 80 to opposing wall 38 of the upper track member 34. At least a portion of the upper flange 68 of molded panel 60 resides in the gap and is sandwiched between opposing wall 38 and flange 86 of the second elongate retainer 80. Screws can then be used to attach the second elongate retainer 80 to the upper track member 34 to firmly hold the molded panel 60 in place relative to the upper track member 34.

Figure 4:
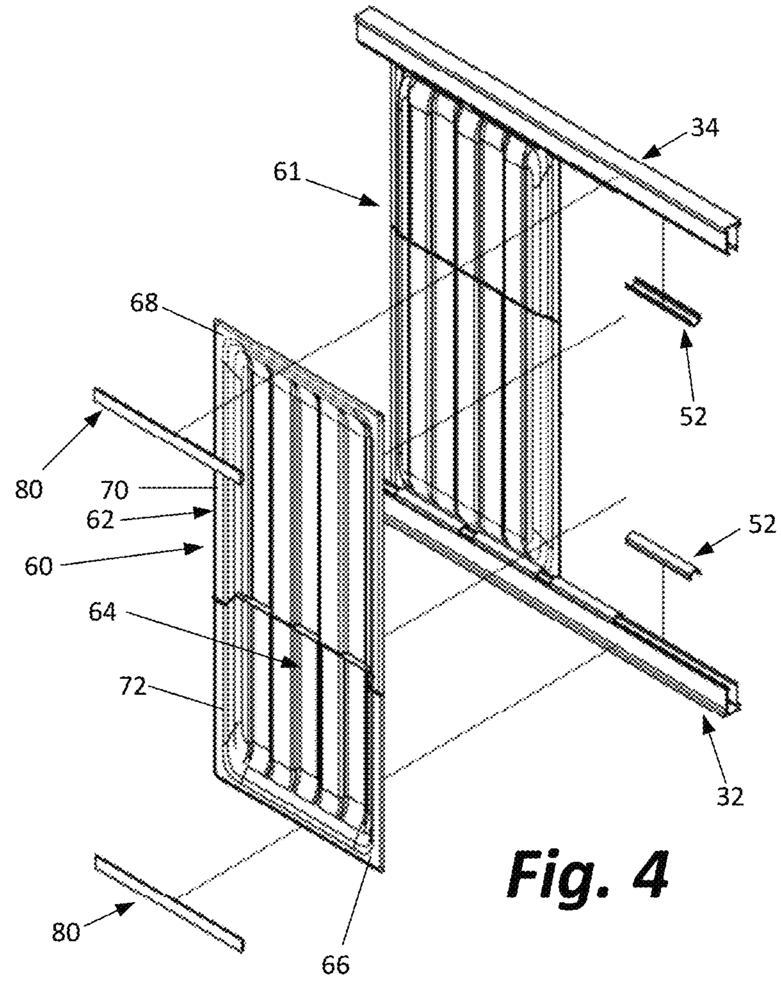
FIG. 4 is an exposed perspective view of the subassembly of FIG. 3.
Figure 5:
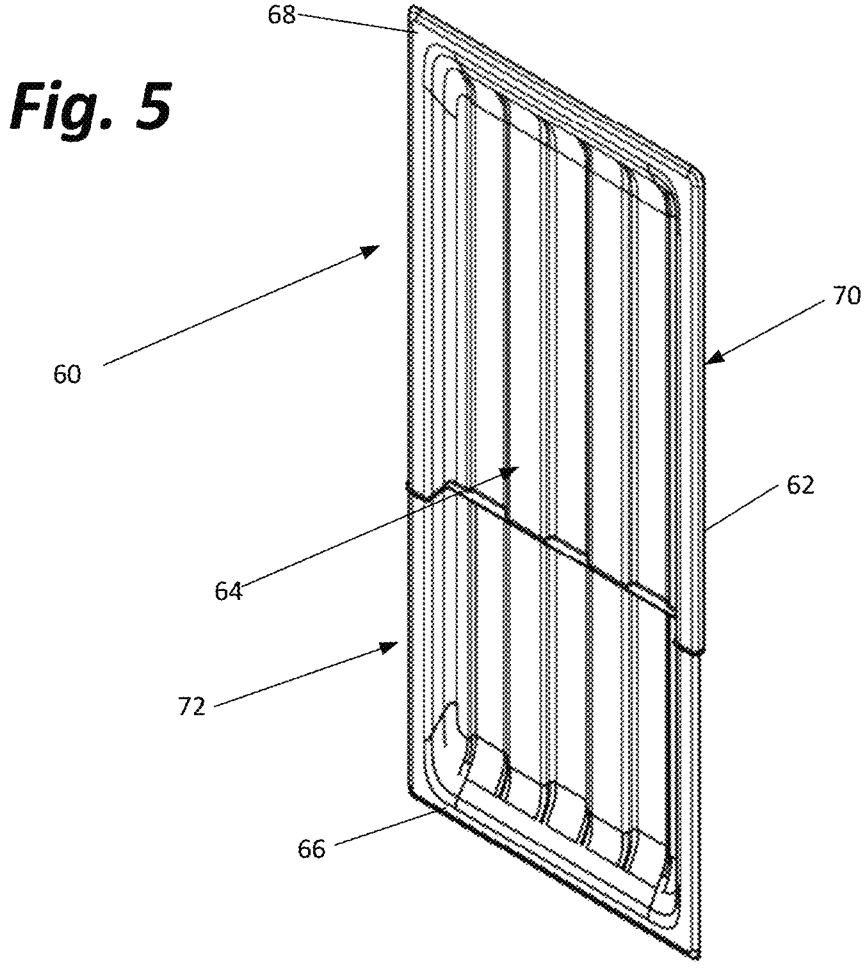
FIG. 5 is a perspective view of a molded panel used in the construction of the subassembly of FIG. 3.
Figures 6, 7, 8, 9, 10:
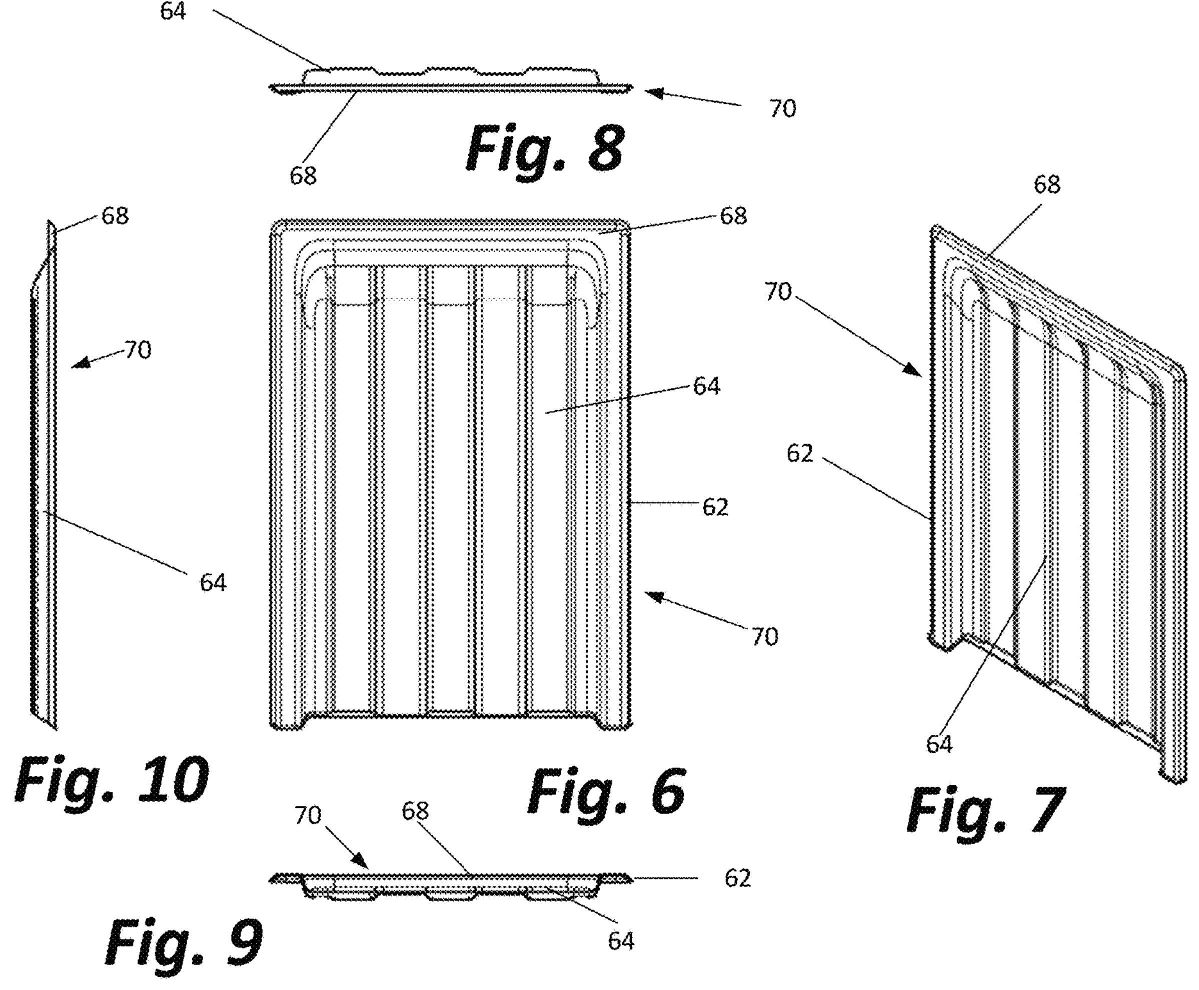
FIG. 6 is a front plan view of the top section of the panel of FIG. 5.
FIG. 7 is a perspective view of the top section of FIG. 6.
FIG. 8 is a top view of the top section of FIG. 6.
FIG. 9 is a bottom view of the top section of FIG. 6.
FIG. 10 is a side view of the top section of FIG. 6.
Figures 11, 12, 13, 14:
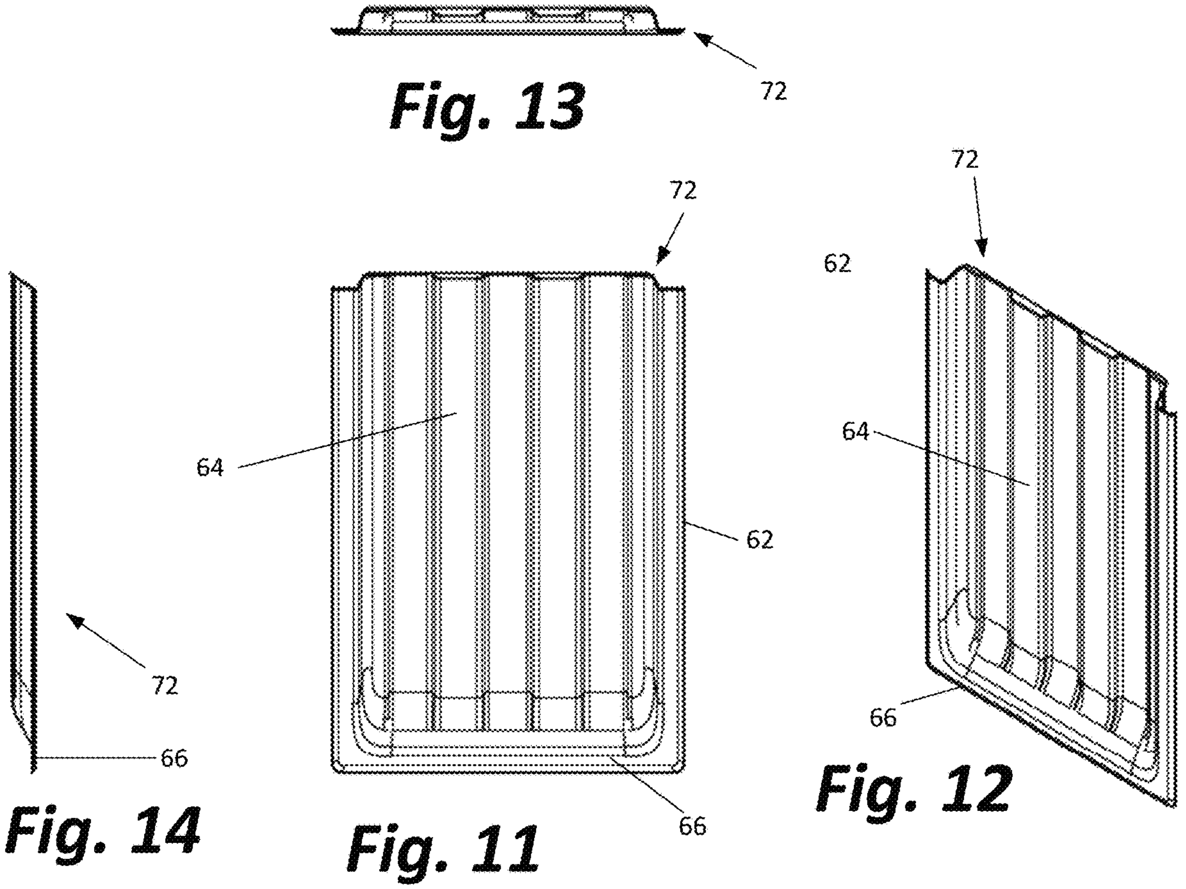
FIG. 11 is a front plan view of the bottom section of the panel of FIG. 5.
FIG. 12 is a perspective view of the bottom section of FIG. 11.
FIG. 13 is a top view of the bottom section of FIG. 11.
FIG. 14 is a side view of the bottom section of FIG. 11.
Figures 15, 16, 17:
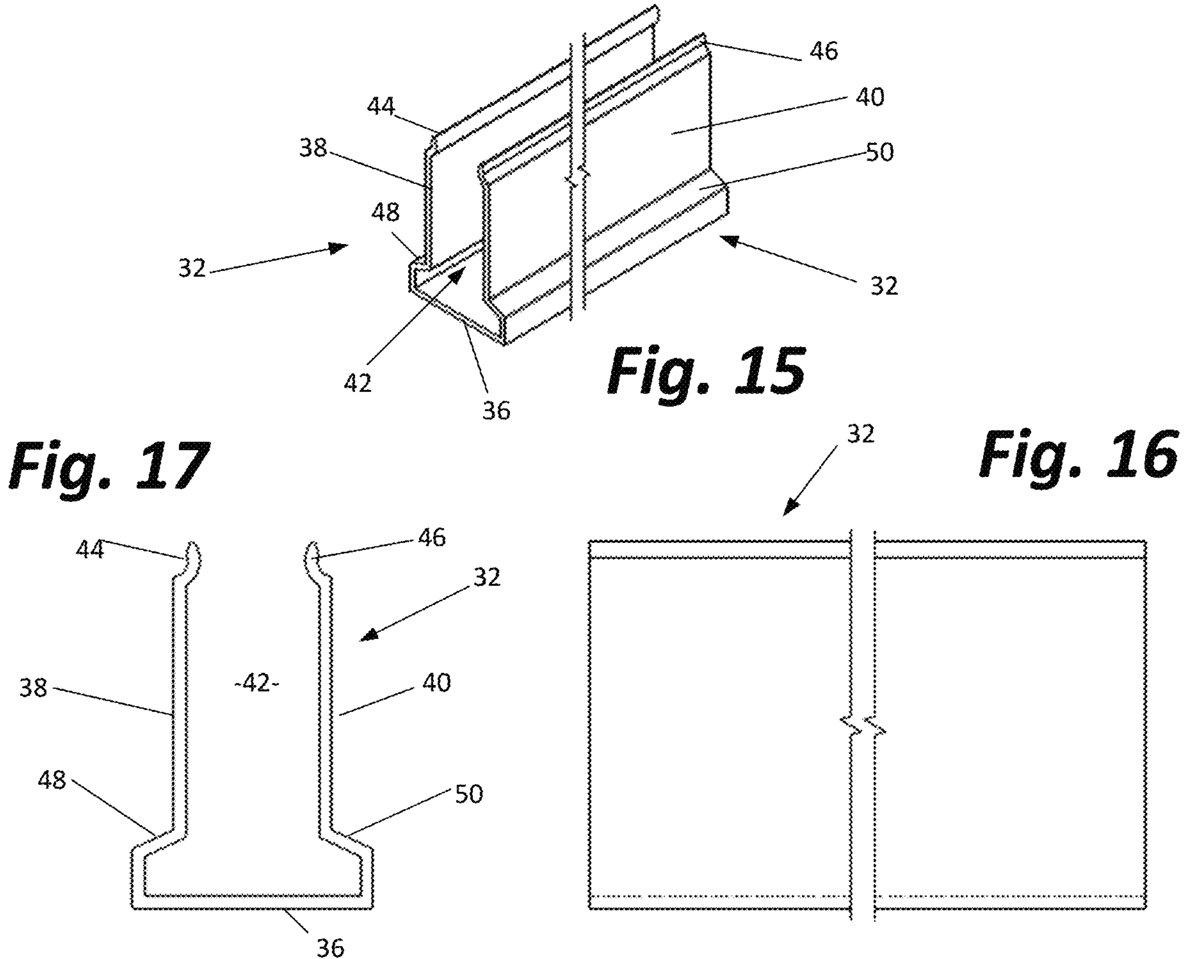
FIG. 15 is a perspective view of a track used in the construction of the subassembly of FIG. 3, the top and bottom track being of the same construction.
FIG. 16 is a side view of the track of FIG. 15.
FIG. 17 is an end view of the track of FIG. 15.

Often, multiple molded panels will be required to form a wall of sufficient length to enclose a unit. See molded panels 60 and 61 in FIG. 3. A plurality of molded panels may, therefore, be employed to complete a wall. See, e.g., molded panels 60 and 61 in FIG. 3. Each such panel is attached in the same way described above to the lower track member(s) and the upper track member(s). However, immediately adjacent panels such as 60 and 61 will the attached so the first panel is attached to the opposing walls 38 of the lower and upper track members 32 and 34 and the second is attached to the opposing walls 40 of the lower and upper track members 32 and 34 as illustrated in FIGS. 3 and 4.

Modifications can be made to the components described above without deviating from the intended embodiments. For example, the elongate retainer 80 may simply consist of a flat plate 82 without an offset flange 86 if the depth of the ledges 48 and 50 approximates the thickness of the flat frame bottom 66 and flat frame top 68 of molded panels 60/61. Likewise, nuts and bolts, rivets, adhesives or weldments may be used to secure the elongate retainer 80 to the opposing walls 38 and 40 of the lower and upper track members 32 and 34. Further, the upper and/or lower track members and elongate retainer may be molded or otherwise formed as a single piece.

The assembly described above provides a skeleton of a modular wall system made, according to embodiments. Typically, wall 30 will also include thermal or sound insulating material positioned within the concave corrugated center section 64 of the molded panel 60. Likewise, exterior finish panels may be releasably fastened to the lower and upper track members 32 and 34, the molded panel 60/61, or the elongate retainers 80 using separate fasteners or providing the elongate retainers with additional fastening elements. How the exterior finish panels are attached will depend on their construction. For example, a finish panel could be a fabric panel secure at the top and bottom with hook and loop type fasteners such as those offered under the VELCRO brand. The finish panels could also be made of wood, a wood composite, steel, aluminum, or plastic. In these cases, mating snaps could be employed to attach the panels to the lower and upper trach members. Screws could also be employed with finishing trim placed over the screws. Embodiments described herein are not limited to these examples.

How the interior of the unit is finished will depend on those amenities available in the public spaces 7 of the shell. If the public spaces 7 of the shell includes shared bathrooms, shower facilities, laundry facilities, kitchen facilities, and entertainment areas, a unit may be nothing more than a private sleeping room equipped with electrical outlets and a heating and air conditioning unit much like a dormitory room. On the other hand, a unit can include any of its own bathroom, shower facilities, laundry facilities, kitchen facilities, and entertainment areas depending on the needs and desires of the purchaser.

One of the advantages offered by the ownership model described herein is that a purchaser such a college student or someone living alone with limited resources, could purchase and live comfortably in a unit of modest size with minimal finishes. As the purchaser's resources and needs grow, the purchaser could buy additional shares to increase the size of the unit and the amenities contained therein. Likewise, a purchaser of a larger unit could sell shares and downsize to match reduced needs and desires.

Still another advantage of the module wall system and ownership model described above is that an owner need not invest in all the components used to create a modular wall. The enterprise will typically retain ownership of the upper and lower track members and covers. The expense of shared walls between units can be constructed using components separately owned by the owners of such units. More specifically, when a wall of modular construction is built between a pair of contiguous units or spaces assigned to different purchasers, the wall of modular construction between the pair of contiguous units or spaces may be constructed of reusable components, at least a first of which is separately owned and continues to be owned by a first purchaser, and a second of which is owned and continues to be owned by a second purchaser. Associated with such retained ownership of components by the first or second purchasers is the right to transfer such ownership of such components to others, e.g., a party to whom the purchaser's unit is later assigned.

Also, during initial buildout of units in a shell, a wall may be constructed between first and second contiguous units on opposing sides of the wall. The first contiguous unit may be assigned to a first purchaser before the second contiguous unit on the other side of the wall is assigned to a second purchaser. In such cases the wall of modular construction may be constructed of reusable components, at least a first of which is separately owned and continues to be owned by the first purchaser, and a second of which is owned and continues to be owned by the enterprise. When the second contiguous unit is later assigned to the second purchaser, the enterprise may transfer ownership of some of the components of the modular wall between the two contiguous units then owned by the enterprise to the second purchaser. Later, such purchasers can likewise transfer ownership of the components they own to someone else. Of course, the expense of shared walls between a unit and a common space in the shell can be constructed of components owned by the owner of the unit and the enterprise.

Additionally, since the community has shells in different geographic locations, a purchaser who desires to relocate could seek to have a unit moved from one shell to another. For example, a young professional that works in another city, country, or continent for periods of time, could find this flexibility useful. Further, a purchaser approaching retirement and owning a larger unit, could use the shares the purchaser owns to secure two smaller units in different shells in geographic locations and split time between the units. Others may find the flexibility offered by the modular walls and ownership model described above advantageous for entirely different reasons. As such, these examples are not intended to be limiting.

The ownership model and use of modular construction and reusable materials makes the foregoing, and more, possible.

Various additional advantages of embodiments described herein should be apparent to one of ordinary skill in the art from the foregoing detailed description and the accompanying drawings. This disclosure is therefore not intended to be limiting.

The invention claimed is:

1. A wall of modular construction comprising:

a lower track member and an upper track member each comprising a base and first and second opposing walls extending from said base, said opposing walls defining a utility channel and opposing retention members; and at least one molded panel having a center section, a lower flange adapted to be coupled to one of the opposing walls of said lower track member by a first elongate retainer and at least one first fastener, and an upper flange adapted to be coupled to one of the opposing walls of said upper track member by a second elongate retainer and at least one second fastener, wherein the center section includes:

a bottom panel section and a top panel section, the bottom panel section and the top panel section configured to telescope relative to each other to create variations in wall height between the lower track member and the upper track member, wherein the at least one molded panel is configured to, when a first molded panel is installed to subdivide a space on a first side and at least partially overlaps a second molded panel installed to subdivide a space on a second side opposite the first side, and the first molded panel is removed, the second molded panel remains installed.

2. The wall of modular construction of claim 1 further comprising a lower utility channel cover adapted to be coupled to the opposing retention members of the lower track member, and an upper utility channel cover adapted to be coupled to the opposing retention members of the upper track member.

3. The wall of modular construction of claim 1 wherein after the top panel section and the bottom panel section are telescoped to a given wall height, the top panel section and the bottom panel section are joined together to form a full panel.

4. The wall of modular construction of claim 1 wherein said wall of modular construction is built between a pair of contiguous spaces, one of said pair of contiguous spaces assigned to a first purchaser, and wherein said wall of modular construction built between the pair of contiguous spaces is constructed of reusable components, at least a first of which is separately owned, continues to be owned and is transferable by said first purchaser, and a second of which is owned, continues to be owned and is transferable by someone other than the first purchaser.

5. The wall of modular construction of claim 1, wherein the at least one molded panel is shaped for structural integrity to support a load between the lower track member and the upper track member.

6. The wall of modular construction of claim 1, wherein the bottom panel section comprises a set of interlocking fingers and the top panel section comprises an opposing set of interlocking fingers that, when interlaced, join the bottom panel section and the top panel section together.

7. The wall of modular construction of claim 1, wherein at least one of the bottom panel section or the top panel section comprises a tongue and at least one of the bottom panel section or the top panel section comprises a groove that, when interlaced, join the bottom panel section and the top panel section together.

8. The wall of modular construction of claim 1, wherein the first molded panel is installed between the lower track member and the upper track member, the wall further comprising a third molded panel installed between the lower track member and the upper track member adjacent the first molded panel, wherein the third molded panel further subdivides the space on the first side.

9. A method of modular construction of a wall comprising:

securing a lower track member to a flooring member and an upper track member to a ceiling member, each lower track member and upper track member comprising a base and first and second opposing walls extending from said base, said walls defining a utility channel and opposing retention members;

coupling a lower utility channel cover to the opposing retention members of the lower track member;

coupling an upper utility channel cover to the opposing retention members of the upper track member;

providing at least one molded panel having a center section including a bottom panel section and a top panel section, an upper flange and a lower flange;

telescoping the bottom panel section and the top panel section relative to each other to create variations in wall height between the lower track member and the upper track member;

securing the lower flange of the at least one molded panel to the first opposing wall of the lower track member using a first elongate retainer and at least one first fastener;

securing the upper flange of the at least one molded panel to the first opposing wall of the upper track member using a second elongate retainer and at least one second fastener, wherein when a first molded panel is installed to subdivide a space on a first side and at least partially overlaps a second molded panel installed to subdivide a space on a second side opposite the first side, and the first molded panel is removed, the second molded panel remains installed.

10. The method of modular construction of a wall of claim 9 wherein after the top panel section and the bottom panel section are telescoped to a given wall height, the top panel section and the bottom panel section are joined together to form a full panel.

11. The method of modular construction of a wall of claim 9 wherein a plurality of molded panels, all of the same construction, are used to construct the wall.

12. The method of modular construction of a wall of claim 11 wherein at least one of said plurality of molded panels is owned by a first person and at least one other of said plurality of molded panels is owned by a second person.

13. The method of modular construction of a wall of claim 9 further comprising applying an insulative material to at least the center section of the at least one panel.

14. The method of modular construction of a wall of claim 9 further comprising applying a sound absorbing material to at least the center section of the at least one panel.

15. The method of modular construction of a wall of claim 9 further comprising applying a surface finishing layer on at least a first side of the at least one molded panel.

16. The method of modular construction of a wall of claim 9, wherein the at least one molded panel is shaped for structural integrity to support a load between the lower track member and the upper track member.

17. The method of modular construction of a wall of claim 9, wherein the bottom panel section comprises a set of interlocking fingers and the top panel section comprises an opposing set of interlocking fingers that, when interlaced, join the bottom panel section and the top panel section together.

18. The method of modular construction of a wall of claim 9, wherein at least one of the bottom panel section or the top panel section comprises a tongue and at least one of the bottom panel section or the top panel section comprises a groove that, when interlaced, join the bottom panel section and the top panel section together.

19. The method of modular construction of a wall of claim 9, wherein the first molded panel is installed between the lower track member and the upper track member, the method further comprising installing a third molded panel between the lower track member and the upper track member adjacent the first molded panel, wherein the third molded panel further subdivides the space on the first side.

20. The method of modular construction of a wall of claim 9, wherein installing the first molded panel on the first side comprises telescoping a first bottom panel section of the first molded panel relative to a first top panel section of the first molded panel and joining the first bottom panel section and the first top panel section, and wherein installing the second molded panel on the second side comprises telescoping a second bottom panel section of the second molded panel relative to a second top panel section of the second molded panel and joining the second bottom panel section and the second top panel section opposite the first molded panel.

* * * * *